June 24, 1930.   H. L. JOHNSTON   1,767,001
WASTE FOOD HANDLING APPARATUS
Filed Jan. 16, 1928
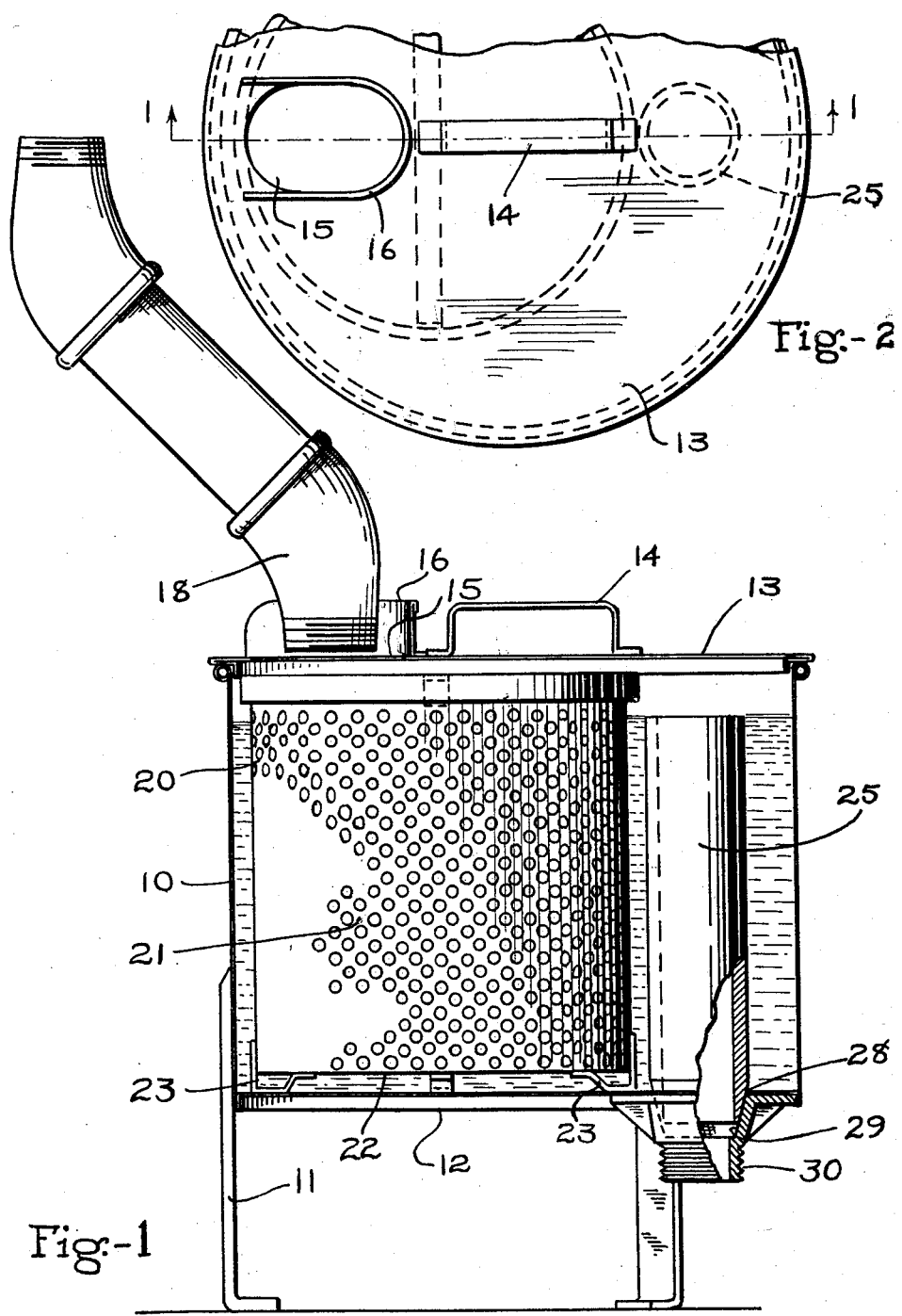
INVENTOR
Hubert L. Johnston
BY
Marechal & Roe
ATTORNEYS Patented June 24, 1930

1,767,001

UNITED STATES PATENT OFFICE

HERBERT L. JOHNSTON, OF TROY, OHIO, ASSIGNOR TO THE HOBART MANUFACTURING COMPANY, OF TROY, OHIO, A CORPORATION OF OHIO

WASTE-FOOD-HANDLING APPARATUS

Application filed January 16, 1928. Serial No. 247,235.

This invention relates to strainers and particularly to strainers adapted to be used in connection with the paring of potatoes, and the like, to remove the parings from water.

One of the principal objects of the invention is the provision of a strainer of this character having a foraminous container adapted to receive a mixture of liquid and solid or semisolid matter, means being provided to prevent clogging of the holes of the container.

A further object of the invention is a provision of a strainer of the character mentioned in which means are provided for maintaining the container immersed in a quantity of water to a level near the top of the container so that the water of the mixture received by the container can effectively pass through the openings in the walls of the container without causing clogging of the openings.

Other objects and advantages of the invention will be apparent from the following description and the accompanying drawings in which—

Fig. 1 is a central vertical section through a strainer embodying the present invention, on the line 1—1 of Fig. 2; and Fig. 2 is a partial top plan view of the strainer.

Referring more particularly to the drawing by reference numerals, the tank 10, preferably constructed of sheet metal, is shown mounted on the legs 11 so that the bottom 12 of the tank is spaced above the lower ends of the legs. This tank is provided with a cover or lid 13 having a handle 14 permitting its ready removal. At one side of the handle the lid or cover is cut away as indicated at 15 the opening having an upstanding wall 16 extending part way around it. The tank 10 is preferably portable, and as shown is positioned to receive the lower end of a discharge pipe 18 leading from a potato parer, or the like, the lower end of this pipe being received within the wall 16 and above the opening 15 in the cover, to discharge through such opening.

Provided in the tank 10 is a container or strainer 20 the side walls 21 of which are provided with a large number of strainer openings, the bottom 22 of the container being likewise, preferably, of a foraminous nature. The bottom 22 is adapted to be supported above bottom 12 of the tank by means of supporting feet 23 which rest on the bottom of the tank. The diameter of the container 20 is somewhat less than the diameter of the tank sufficient space being provided to receive an upright pipe 25 at one side of the container 20. This pipe 25 is open at the top and is adapted to maintain the liquid level in the tank. As shown the pipe 25 has its upper end at such height as to maintain the liquid level sufficiently high to immerse substantially all the perforated portion of the strainer 20. The lower end of the pipe 25 is tapered as shown at 28 and is received in a correspondingly tapered socket member 29 provided in the bottom of the tank, which serves as a water-discharge or outlet connection 30. The two surfaces 28 and 29 form an approximately watertight joint preventing the surrounding water from flowing into the outlet connection 30 without passing through the pipe from the top opening. The outlet connection 30 is threaded to receive a suitable discharge pipe, or the mechanism may be positioned with the outlet connection located to discharge directly into a drain.

If a mixture of water and vegetable parings were discharged directly into a sewer connection of a building the latter would soon clog up and it is therefore necessary to separate the peelings from the water so that the refuse water may be conducted away and the refuse semisolid matter separated and collected. The mixture of water and parings or other such matter flowing through the pipe 18, is discharged into the strainer 20 through the opening 15. The outlet pipe 25 being in place with its lower end seated in the tapered socket 29, the water which passes through the openings of the walls of the strainer is retained in the tank until the water level rises sufficiently to overflow the top of the pipe 25. As the flow of water and waste matter through the pipe 18 continues the water will continue to pass through the openings in the wall of the strainer while the semisolid matter to be collected in the strainer is prevented from passing through these openings which are of sufficiently small size as to effectively prevent the passage of the pieces of the waste matter. The openings however, as shown in the drawing, are of substantial size so that small particles or pieces of foreign substances such as sand or other gritty matter usually present with potato peelings can pass along through the openings and settle to the bottom of the tank 10. The flow of water in the tank is comparatively slow especially around the strainer, so the sand and the like readily settles to the bottom of the tank, from which it may be removed and disposed of. The holes in the strainer or container 20, although of substantial size are smaller than the usual potato peelings or chips and these cannot pass through. This matter is separated and retained without clogging the openings in the walls of the strainer member. The water around the strainer being maintained at a level adjacent the top of the strainer, the flow of the water through the foraminous strainer walls is therefore slow, since all of the openings of the strainer are effective in permitting the gradual flow of water from the inside to the outside of the strainer. Consequently the small pieces of vegetable matter or other waste matter which are retained in the strainer member will not be forced violently or dashed against the openings in the strainer walls, but the refuse semisolid matter may settle at the bottom and form a pile of gradually increasing size without in any way clogging those openings in the side walls which are above the level of the top of the pile in the strainer member. It has been found that the maintenance of a surrounding body of water to a level adjacent the top of the strainer member causes the latter to be effective in separating many times the amount of semisolid matter from water that could be handled without the clogging of the wall openings if no such surrounding body of water were present and the usual manner of straining were used.

After the strainer member 20 has been filled with the waste or solid matter desired to be separated from the water, the lid or cover of the tank is removed and pipe 25 is lifted bodily from its seat in the discharge connection at the bottom of the tank. The water in the tank then runs out completely and the container 20 is then lifted out of the tank and the waste matter emptied. Upon the return of the strainer member 20 to the tank, and the replacement of the pipe 25 the straining operation may be continued.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A strainer adapted for use with a vegetable peeling machine having a discharge pipe through which a water suspension of peelings and impurities is discharged, comprising a tank having an opening therein, a hollow manually portable container having side and bottom walls and removably supported within said tank to be readily removed as a unit through said opening in said tank for dumping, said container being adapted to receive the water suspension from said discharge pipe of said peeling machine within the interior of said container, and having perforations in the wall thereof of a comparatively large size to form the straining surface and permit the water and finer impurities to freely pass therethrough while serving to retain the larger impurities and peelings within said container, and means for maintaining water in the tank and container to a predetermined level for partially submerging the perforated wall of the container but below the top of the container whereby the water suspension does not normally overflow the top of the container, the container communicating freely through said comparatively large size perforations with the water space within the tank on the exterior of the container providing a gradual flow of water from the inside to the outside of said container without objectionable packing or clogging of the peelings within the container against the said perforations therein.

2. A strainer adapted for use with a vegetable peeling machine having a discharge pipe through which a water suspension of peelings or impurities is discharged, comprising a portable tank having an open top, a hollow open top manually portable container commensurate in size with but somewhat smaller than said tank removably supported in position within said tank to receive the water suspension from said discharge pipe within the interior of said container, means for removably supporting said container in spaced relation to the bottom of said tank whereby the container may be readily removed as a unit through the open top of said tank for dumping, said container having comparatively large size perforations in the side and bottom walls thereof to form the straining surface and permit the water and finer impurities to freely pass therethrough while serving to retain the larger impurities and peelings within said container, overflow means for removing water from said tank and for maintaining the water level in the tank and container at a predetermined height near but below the top of said container whereby the water suspension does not normally overflow the top of said container, the container communicating freely through said comparatively large size perforations with the water space within said tank on the exterior of the container providing a gradual flow of water from the inside to the outside of said container without objectionable packing or clogging of the peelings within the container against the said perforations therein, and means for draining said tank to remove finer impurities settling therein on the exterior of said container.

3. A strainer adapted for use with a vegetable peeling machine having a discharge pipe through which a water suspension of peelings is discharged, comprising a tank having an open top, a hollow open top manually portable container having a substantially cylindrical side wall and a substantially flat bottom removably supported within said tank to be readily withdrawn as a unit through the open top of the tank for dumping, said container being adapted to receive the water suspension from said discharge pipe of said peeling machine within the interior thereof and having relatively large size perforations in the said wall thereof to form the straining surface and permit the water and finer impurities to pass therethrough while serving to maintain the larger impurities and peelings within said container, said container having a substantial available volume for the accumulation of a considerable quantity of the larger impurities therein, and an upstanding overflow pipe removably supported within said tank on the exterior of said container on the side opposite to that at which the discharge pipe from said peeling machine is adapted to discharge, said overflow pipe serving to maintain water in the tank and container at a predetermined level near but below the top of said container whereby the water suspension does not normally overflow the top of said container, the container communicating freely through said comparatively large size perforations with the water space within said tank on the exterior of the container providing a gradual flow of water from the inside to the outside of the container without objectionable packing or clogging of the peelings within said container against the said perforations therein, the removal of said overflow pipe permitting draining of said tank and permitting said container to be slid to that side of the tank normally occupied by said overflow pipe and readily removed from said tank without interference with said discharge pipe.

4. A strainer adapted for use with a vegetable peeling machine having a discharge pipe through which a water suspension of peelings and impurities is discharged, comprising a tank having an open top, a removable cover for said tank having an opening therein adapted to permit the passage of the water suspension from said discharge pipe, a hollow open-top manually portable container having side and bottom walls and removably supported within said tank in a position to receive within the interior of said container the water suspension from said discharge pipe as it passes through the opening in the said cover of said tank, said container having relatively large size perforations in the wall thereof to form the straining surface and permit the water and finer impurities to freely pass therethrough while serving to retain the larger impurities and peelings within said container, said container being readily removable as a unit through the open top of said tank when the cover for said tank is removed to permit the accumulated peelings within said container to be dumped, and means for maintaining water in the tank and container at a predetermined level near but below the top of said container whereby the water suspension does not normally overflow the top of said container, said container communicating freely through said comparatively large size perforations with the water space within said tank on the exterior of the container providing a gradual flow of water from the inside to the outside of the container without objectionable packing or clogging of the peelings within the container against the said perforations therein.

5. A strainer adapted for use with a vegetable peeling machine having a discharge pipe through which a water suspension of peelings and impurities is discharged, comprising a portable tank having an open top, a removable cover for said tank having an opening therein adapted to permit the passage of the water suspension from said discharge pipe, a hollow open top manually portable container having side and bottom walls and removably supported within said tank in a position to receive within the interior of said container the water suspension from said discharge pipe as it passes through the opening in the said cover of said tank, said container having relatively large size perforations in the wall thereof to form the straining surface and permit the water and finer impurities to freely pass therethrough while serving to retain the larger impurities and peelings within said container, said container being readily removable as a unit through the open top of said tank when the cover for said tank is removed to permit the accumulated peelings within said container to be dumped, means for maintaining water in the tank and container at a predetermined level near but below the top of said container whereby the water suspension does not normally overflow the top of said container, said container communicating freely through said comparatively large size perforations with the water space within said tank on the exterior of the container providing a gradual flow of water from the inside to the outside of the container without objectionable packing or clogging of the peelings within the container against the said perforations therein, and an upstanding splash preventing baffle on said cover for the tank adapted to receive the lower end of said discharge pipe, said baffle being broken away on one side thereof to permit said portable tank to be withdrawn from its position for receiving the water suspension discharging from said pipe.

In testimony whereof I hereto affix my signature.

HERBERT L. JOHNSTON.